US010129436B2

(12) United States Patent
Kimura

(10) Patent No.: US 10,129,436 B2
(45) Date of Patent: Nov. 13, 2018

(54) IMAGE FORMING SYSTEM AND IMAGE FORMING METHOD

(71) Applicant: Konica Minolta, Inc., Chiyoda-ku, Tokyo (JP)

(72) Inventor: Takenobu Kimura, Hachioji (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/072,881

(22) Filed: Mar. 17, 2016

(65) Prior Publication Data

US 2016/0286081 A1 Sep. 29, 2016

(30) Foreign Application Priority Data

Mar. 26, 2015 (JP) ................................. 2015-063837

(51) Int. Cl.
  *H04N 1/405* (2006.01)
  *G06K 15/00* (2006.01)
  (Continued)

(52) U.S. Cl.
  CPC ..... *H04N 1/40087* (2013.01); *G03G 15/5041* (2013.01); *G03G 15/5058* (2013.01);
  (Continued)

(58) Field of Classification Search
  CPC ........... H04N 1/40018; H04N 1/40087; G03G 15/5041; G03G 15/5058; G03G 15/55; G03G 2215/00021
  (Continued)

(56) References Cited

U.S. PATENT DOCUMENTS

2006/0215240 A1* 9/2006 Mongeon ........... H04N 1/40006
  358/504
2012/0062925 A1* 3/2012 Nakamura ............. G03G 15/55
  358/1.13
(Continued)

FOREIGN PATENT DOCUMENTS

| JP | 2009300703 A | 12/2009 |
| JP | 2012-068286 A | 4/2012 |
| JP | 2013186433 A | 9/2013 |

OTHER PUBLICATIONS

Office Action (Notification of Reason for Refusal) dated Apr. 11, 2017, by the Japanese Patent Office in corresponding Japanese Patent Application No. 2015-063837, and an English Translation of the Office Action. 6 pages.

(Continued)

*Primary Examiner* — Quang N Vo
(74) *Attorney, Agent, or Firm* — Buchanan Ingersoll & Rooney PC

(57) ABSTRACT

A image forming system of the present invention includes a control section that causes a pattern image for image density control to be formed on an image carrier, and performs density correction control for correcting a density of a formed image on the basis of density information on the formed pattern image for image density control, wherein the control section determines a timing for performing the density correction control, on the basis of information corresponding to a density difference generated between images formed by the plurality of image forming apparatuses.

23 Claims, 9 Drawing Sheets

(51) Int. Cl.
*H04N 1/40* (2006.01)
*G03G 15/00* (2006.01)
*H04N 1/60* (2006.01)
*G03G 15/23* (2006.01)

(52) U.S. Cl.
CPC .............. *G03G 15/55* (2013.01); *H04N 1/405* (2013.01); *H04N 1/605* (2013.01); *H04N 1/6033* (2013.01); *H04N 1/6055* (2013.01); *G03G 15/231* (2013.01); *G03G 2215/00021* (2013.01)

(58) Field of Classification Search
USPC .................... 358/3.1, 1.9, 1.15, 1.13, 3.06
See application file for complete search history.

(56) References Cited

U.S. PATENT DOCUMENTS

2012/0120422 A1* 5/2012 Hitaka ................. G03G 15/205
358/1.9
2013/0063774 A1* 3/2013 Nuggehalli ........... G06F 3/1207
358/1.15

OTHER PUBLICATIONS

First Office Action issued in corresponding Chinese Patent Application No. 201610177958.7, dated Jan. 3, 2018, with English Translation (27 pages).

* cited by examiner

IMAGE FORMING SYSTEM AND IMAGE FORMING METHOD

BACKGROUND OF THE INVENTION

Field of the Invention

The present invention relates to an image forming system and an image forming method, and more particularly, to an image forming system having a tandem structure and including a plurality of image forming apparatuses connected in series, and an image forming method in the image forming system.

Description of the Related Art

Tandem-type image forming systems have a plurality of image forming apparatuses such as printer and copy machine, connected in series, which form an image on a sheet (refer to, for example, Japanese Patent Application Laid-Open No. 2012-68286). This type of image forming system uses different image forming apparatuses to separately perform processing for, for example, forming images on the front and back sides of the sheet, and thus can increase productivity in comparison with a case of using one image forming apparatus to form images on the front and back sides of the sheet.

SUMMARY OF THE INVENTION

In a tandem-type image forming system including, for example, two image forming apparatuses are connected in series, one of the apparatuses is used specifically for a front surface of the sheet and the other one is used for a back surface of the sheet. Therefore, when densities of images formed by the two image forming apparatuses are not equal, a density difference between the images formed on the front and back sides of the sheet is generated. Even when image density is corrected at the time of start up of the system or on a regular basis to thereby adjust maximum densities and halftone densities, the density difference is generated in the case where states of developers in the two image forming apparatuses change due to deviation or the like of output coverage after the correction. The density difference may possibly exceed an allowable range as a density variation within one job.

The present invention has been made in view of the situation as described above, and an object of the present invention is to provide an image forming system and an image forming method, which can minimize the density difference between images formed by a plurality of image forming apparatuses even if states of developers change.

In order to achieve at least one of the objects described above, an image forming system reflecting one aspect of the present invention includes a plurality of image forming apparatuses which are connected in series and each of which includes: a control section that causes a pattern image for image density control to be formed on an image carrier, and performs density correction control for correcting a density of a formed image, on the basis of density information on the formed pattern image for image density control, wherein the control section determines a timing for performing the density correction control, on the basis of information corresponding to a density difference generated between images formed by the plurality of image forming apparatuses.

In the image forming system described above, it is desirable that the control section performs the density correction control through a sequence different from that for print job performed by the plurality of image forming apparatuses.

In the image forming system described above, it is desirable that the control section performs the density correction control by correcting a gamma curve through image processing.

In the image forming system described above, it is desirable that the information corresponding to the density difference is coverage information on developers of the plurality of image forming apparatuses.

In the image forming system described above, it is desirable that the information corresponding to the density difference is density information on the pattern image for image density control formed on the image carrier in each of the plurality of image forming apparatuses.

In the image forming system described above, it is desirable that the control section executes the density correction control in the case where the density difference generated between the images formed by the image forming apparatuses is not less than a predetermined first threshold value.

In the image forming system described above, it is desirable that the control section performs image stabilizing control on the basis of the density information on the pattern image for image density control formed on the image carrier between images in the case where the density difference generated between the plurality of image forming apparatuses is not less than a second threshold value, which is smaller than the first threshold value.

In the image forming system described above, it is desirable that the plurality of image forming apparatuses can each preferentially select density control of either one of a maximum density and a halftone density, and in the case where the plurality of image forming apparatuses prioritizes the same density control, the control section executes the density correction control when the difference in a density that is not prioritized is not less than a predetermined threshold value.

It is desirable that the image forming system described above further includes a density detecting section which is provided in the vicinity of a sheet conveyance path on the downstream side of an image forming apparatus located on the most downstream side of the plurality of image forming apparatuses, and which is configured to detect a density of a pixel formed on a sheet conveyed on the sheet conveyance path, and the control section acquires information corresponding to the density difference, on the basis of information on a density detected by the density detecting section.

DESCRIPTION OF THE PREFERRED EMBODIMENTS

Hereinafter, a mode for carrying out the invention (hereinafter, referred to as an "embodiment") will be described in detail with reference to the drawings. The present invention is not limited to the embodiment, and various numerical values or other parameters in the embodiment are merely examples. Note that the same reference symbols are attached to the same elements or elements having the same functions in the following description or figures, and explanation thereof will not be repeated.

[Entire Configuration of Image Forming System]

Figure 1:
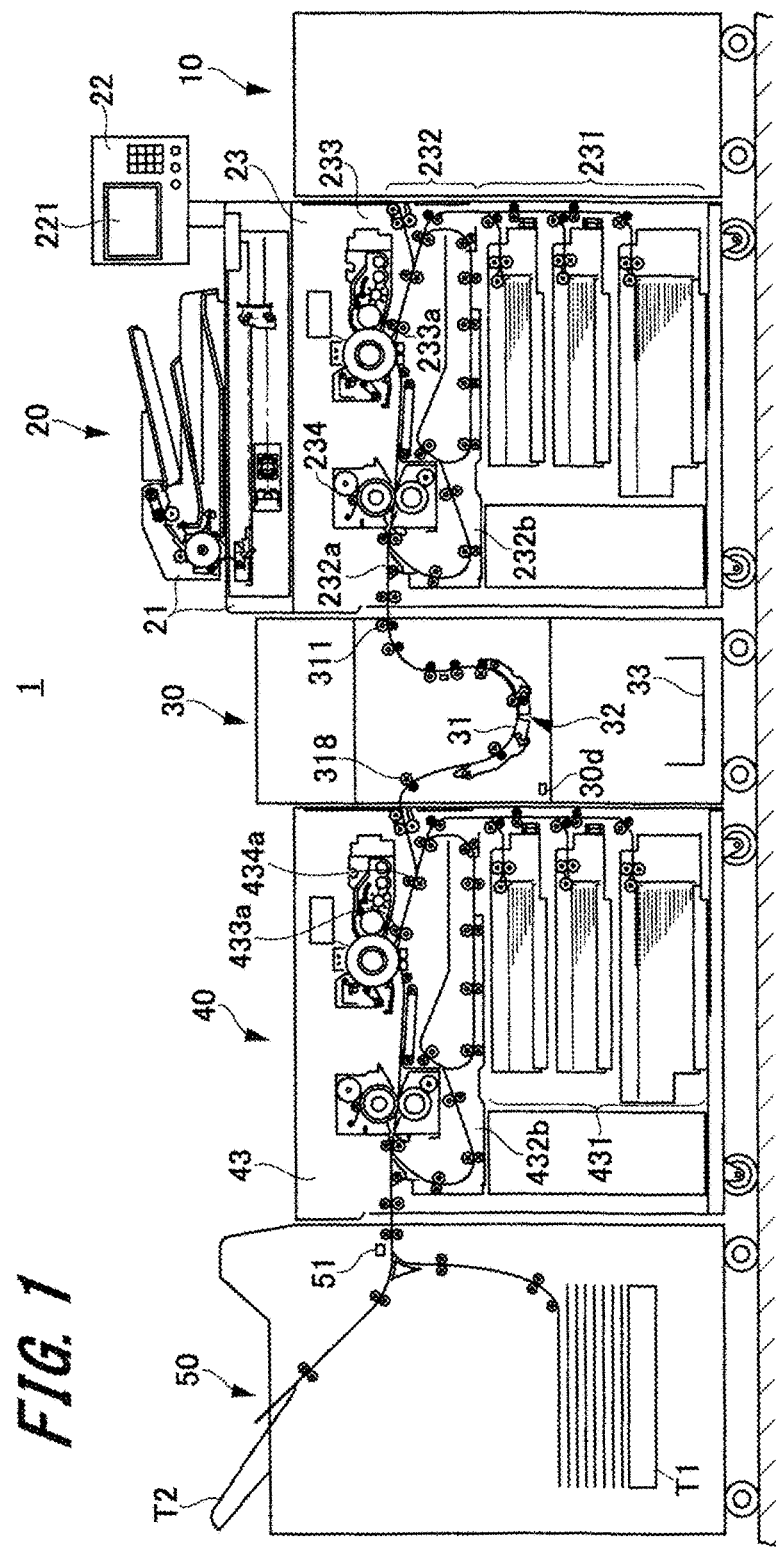
FIG. 1 is a schematic view illustrating the entire configuration of an image forming system according to an embodiment of the present invention.

First, the outline of an image forming system according to an embodiment of the present invention will be generally described with reference to FIG. 1. FIG. 1 is a schematic view illustrating the entire configuration of an image forming system according to an embodiment of the present invention. As illustrated in FIG. 1, an image forming system 1 includes a plurality of image forming apparatuses, for example, two image forming apparatuses: a first image forming apparatus 20 and a second image forming apparatus 40, and has a series tandem-type configuration in which, for example, a sheet feeding apparatus 10, the first image forming apparatus 20, an intermediate apparatus 30, the second image forming apparatus 40, a post-processing device 50 and the like are connected serially from the upstream side in the sheet conveying path.

When the first image forming apparatus 20 and the second image forming apparatus 40 are connected to each other, one of these apparatuses is assigned to the main apparatus that has overall control over the entire image forming system 1, and the other one is assigned to a secondary apparatus that operates in accordance with instructions from the main apparatus. In the embodiment, it is assumed that the first image forming apparatus 20 disposed on the upstream side in the sheet conveying direction is set as the main apparatus, and the second image forming apparatus 40 is set as the secondary apparatus.

In the image forming system 1 according to the embodiment, the first image forming apparatus 20 functions as an apparatus that forms an image on one side (for example, a front side) of a sheet, and the second image forming apparatus 40 functions as an apparatus that forms an image on the other side (for example, a back side) of the sheet in the case where there are executed jobs of a double-sided mode for forming images on both the front and back sides of the sheet. In the case of jobs of the double-sided mode, the first image forming apparatus 20 forms an image on the front side of a sheet conveyed from the sheet feeding apparatus 10 or a sheet feeding section 231 within the first image forming apparatus 20. Furthermore, the sheet having the image formed on the front surface thereof is reversed upside down by a reversing section 232b within the first image forming apparatus 20, and is conveyed through the intermediate apparatus 30 to the second image forming apparatus 40. Then, an image is formed on the back side of the sheet, and is conveyed to the post-processing device 50.

On the other hand, in the case where there are executed jobs of a single-sided mode for forming an image on one side of a sheet, the first image forming apparatus 20 forms an image on one side of a sheet conveyed from the sheet feeding apparatus 10, or the sheet feeding section 231 within the first image forming apparatus 20. Then, the sheet having the image formed on one side thereof passes through the intermediate apparatus 30 and the second image forming apparatus 40, and is conveyed to the post-processing device 50.

(Sheet Feeding Apparatus)

The sheet feeding apparatus 10, which is also referred to as a paper feed unit (PFU), includes a plurality of sheet feeding trays, and sheet feeding means including a sheet feeding roller, a separation roller, a sheet feeding/separation rubber, a feed-out roller, and the like. Each of the sheet feeding trays houses sheets identified in advance according to types of sheet (a sheet type, basis weight, a size of sheet, and the like). The sheet feeding means feeds the sheets housed in each of the sheet feeding trays, one by one from the uppermost sheet to the sheet conveying section 232 of the first image forming apparatus 20. Information (a size of sheet, a sheet type, and the like) on the type of sheet housed in each of the sheet feeding trays is stored in a non-volatile memory 251, which will be described later, of the first image forming apparatus 20. The sheet feeding apparatus 10 functions as a sheet feeding section for the first image forming apparatus 20.

(First Image Forming Apparatus)

The first image forming apparatus 20 reads an image from a document, and forms the read image on a sheet. Alternatively, the first image forming apparatus 20 receives, from an external apparatus or the like, printing data and print-setting data in a page description language format such as a page description language (PDL) format or a Tiff format, and forms an image on the sheet on the basis of the received printing data, print-setting data, and the like. The first image forming apparatus 20 is constituted by including an image reading section 21, an operation display section 22, a printing section 23, and the like.

The image reading section 21 includes an auto document-feeding section also referred to as an auto document feeder (ADF), and a reading section, and reads images on a plurality of documents on the basis of setting information received through the operation display section 22. A document placed on a document tray of the auto document-feeding section is conveyed to a contact glass serving as a reading location. Images on one side or both sides of the document are read using an optical system including a charge coupled device (CCD) 211 (refer to FIG. 2). These images also include image data such as figures and photographs as well as text data such as letters and symbols.

The operation display section 22 is constituted of, for example, a liquid crystal display (LCD) 221, a touch panel provided so as to cover the LCD 221, various switches and buttons, a numeric keypad, an operation key group, and the like. The operation display section 22 receives instructions from a user, and outputs the operational signals to a control section 250 which will be described later. In addition, the operation display section 22 displays, on the LCD 221, various types of setting screens for inputting various types of operation instructions and setting information, and operation screens that display various processing results, in accordance with display signals inputted from the control section 250.

The printing section 23 performs electrophotographic image forming processing, and includes various sections related to print output, such as a sheet feeding section 231, a sheet conveying section 232, an image forming section 233, and a fixing section 234. Note that, in the printing section 23 of the embodiment, an example of employing an electrophotographic method will be described. However, the example is not limited to this method, and other printing type such as an ink jet type, or thermal printing may be employed.

The sheet feeding section 231 includes a plurality of sheet feeding trays and sheet feeding means including a sheet feeding roller, a separation roller, a sheet feeding/separation rubber, a feed-out roller, and the like, each of which is provided for each of the sheet feeding trays. Each of the sheet feeding trays houses sheets which are identified in advance according to types of sheet (a sheet type, basis weight, and a size of sheet, and the like) and which are to be fed. The sheet feeding means feeds the sheets housed in each of the sheet feeding trays, one by one from the uppermost sheet toward the sheet conveying section 232. In addition, information (for example, a sheet type, basis weight, a size of sheet, and the like) on the type of sheet housed in each of the sheet feeding trays is stored in the non-volatile memory 251.

The sheet conveying section 232 conveys the sheet fed from the sheet feeding apparatus 10 or the sheet feeding section 231, to the sheet conveyance path that passes through a plurality of intermediate rollers and a resist roller and the like, and reaches the image forming section 233. Then, the sheet conveying section 232 conveys the sheet to a transferring position of the image forming section 233, and further conveys it to the second image forming apparatus 40. The sheet temporarily stops on the upstream side of a resist roller 233a that performs skew correction, and then is conveyed to the downstream side of the resist roller 233a in accordance with the timing of image formation.

Furthermore, the sheet conveying section 232 includes a conveyance path switching section 232a and a reversing section 232b constituted of a reversing roller or the like. The reversing section 232b conveys the sheet which has passed through the fixing section 234, to an apparatus coupled downstream side of the reversing section 232b without reversing the sheet upside down, or performs switchback by using a reversing roller or the like to thereby reverse the sheet upside down, and then conveys the sheet to an apparatus coupled downstream side of the reversing section 232b, in accordance with switching operation by the conveyance path switching section 232a. In addition, the reversing section 232b may include a circulation path section that reverses upside down the sheet which has passed through the fixing section 234, and feeds again the sheet to the image forming section 233 of the first image forming apparatus 20.

The image forming section 233 includes a photoreceptor drum, a charging device, an exposure device, a development device, a transfer device, a cleaning device and the like, and forms an image on the surface of a sheet, on the basis of printing image data. Note that, in the case where the first image forming apparatus 20 forms a color image, the image forming section 233 is provided for each color (Y, M, C, and Bk).

In the image forming section 233, light in accordance with printing image data is emitted from the exposing section onto the surface of the photoreceptor drum charged by using the charging section, and an electrostatic latent image is written on the surface of the photoreceptor drum. Then, toner charged by a two-component development unit using two-component developer is attached onto the surface of the photoreceptor drum, and thus the electrostatic latent image written on the surface of the photoreceptor drum is developed. The toner image attached on the photoreceptor drum is transferred on a sheet at a transferring position. After the toner image is transferred on the sheet, the residual charge, residual toner, or the like left on the surface of the photoreceptor drum is removed, and the removed toner or the like is collected in the toner collecting container.

The fixing section 234 includes a fixing heater, a fixing roller, a fixing external heating section and the like, is adapted to thermally fix the toner image transferred on the sheet.

(Intermediate Apparatus)

The intermediate apparatus 30 is disposed on the downstream side of the first image forming apparatus 20 and on the upstream side of the second image forming apparatus 40, in the sheet conveying direction. In the embodiment, the intermediate apparatus 30 conveys the sheet conveyed from the first image forming apparatus 20, to the second image forming apparatus 40 in accordance with instructions from the second image forming apparatus 40.

The length of a sheet conveyance path 31 of the intermediate apparatus 30 is set so that the trailing edge of a sheet does not remain in the first image forming apparatus 20 in the case where the intermediate apparatus 30 or the second image forming apparatus 40 gives an instruction to stop the sheet within the sheet conveyance path 31. The sheet conveyance path 31 is constituted so as to be curved from the vicinity of the conveyance roller 311 on the sheet entering side to the vicinity of the conveyance roller 318 on the sheet discharging side when viewed from the front side of the intermediate apparatus 30. In the embodiment, the sheet conveyance path 31 has a curved shape with a substantially U shape that protrudes downward. The length of the sheet conveyance path 31 can be ensured within a limited space by curving the shape of the sheet conveyance path 31. In other words, the size of the intermediate apparatus 30 is reduced while the length of the sheet conveyance path 31 is ensured, by curving the shape of the sheet conveyance path 31.

Examples of the length required for the sheet conveyance path 31 will be described below.

First, in the case where the sheet stopping position exists in the middle of the sheet conveyance path of the second image forming apparatus 40, the length of the sheet conveyance path 31 is formed so that the trailing edge of the sheet is positioned within the intermediate apparatus 30, with the leading edge of the sheet that stops within the second image forming apparatus 40 being as a base point.

Second, in the case where the sheet stopping position exists in the middle of the sheet conveyance path 31 of the intermediate apparatus 30, the length of the sheet conveyance path 31 is formed so that the trailing edge of the sheet is positioned within the intermediate apparatus 30, with the leading edge of the sheet that stops within the intermediate apparatus 30 being as a base point.

(Second Image Forming Apparatus)

The second image forming apparatus 40 is constituted by including, for example, a printing section 43, and forms an image on the surface of a sheet in cooperation with the first image forming apparatus 20. The sheet conveyed from the first image forming apparatus 20 is conveyed through a conveyance roller 434a to a resist roller 433a. The sheet is temporarily made stand-by on the upstream side of the resist roller 433a, and then conveyance to the downstream side of the resist roller 433a is restarted in accordance with the timing of image formation.

Note that the printing section 43 included in the second image forming apparatus 40 is constituted by including various sections related to print output, such as a sheet feeding section 431, a sheet conveying section including a reversing section 432b, an image forming section, and a fixing section, as with the printing section 23 included in the first image forming apparatus 20. The explanation thereof will be omitted for avoiding overlapping.

(Post-Processing Device)

The post-processing device 50 is disposed on the downstream side of the second image forming apparatus 40 in the sheet conveying direction, and includes various post-processing sections such as a sorting section, a stapling section, a punching section, and a folding section, sheet receiving trays (a large-capacity sheet receiving tray T1 and a sub-tray T2) and the like. The post-processing device 50 applies various post-processing to a sheet conveyed from the second image forming apparatus 40, and the sheet subjected to the post-processing is discharged to the large-capacity sheet receiving tray T1 or the sub-tray T2. The large-capacity sheet receiving tray T1 includes a stage that moves up and down, and houses a large amount of sheets in a state of being stacked on the stage thereof. As to the sub-tray T2, sheets are discharged on the sub-tray T2 in a visible state where the sheets are externally exposed.

[Internal Configuration of First Image Forming Apparatus]

Figure 2:
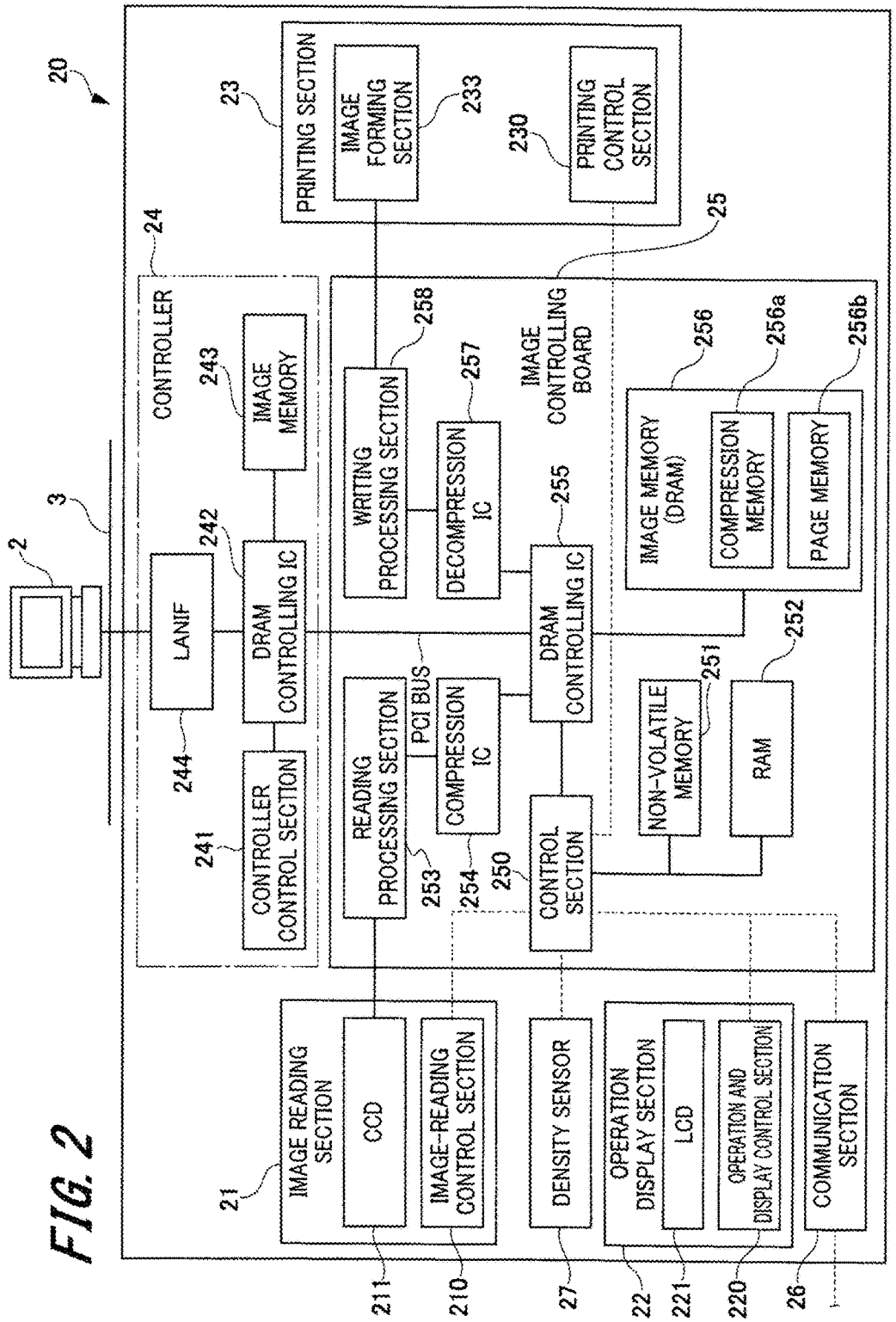
FIG. 2 is a block diagram illustrating the internal configuration of a first image forming apparatus in the image forming system according to the embodiment.

FIG. 2 is a block diagram illustrating the internal configuration of the first image forming apparatus 20 in the image forming system 1 according to the embodiment. As illustrated in FIG. 2, the first image forming apparatus 20 is constituted by including the image reading section 21, the operation display section 22, the printing section 23, a controller 24, an image control board 25, a communication section 26, a density sensor 27 and the like. The first image forming apparatus 20 is connected to an external apparatus 2 on a network 3 via a local area network inter face (LANIF) 244 of the controller 24, in a data exchangeable manner.

The image reading section 21 includes the auto document-feeding section described above, the reading section described above, and an image-reading control section 210. The image-reading control section 210 controls the auto document-feeding section, the reading section and the like on the basis of instructions from the control section 250, to thereby achieve a scanner function of reading images on a plurality of documents. Analog image data read by the image reading section 21 are outputted to a reading processing section 253, and are subjected to analog-to-digital conversion and various image processing in the reading processing section 253.

The operation display section 22 includes the LCD 221 described above, the touch panel described above and the like, and an operation and display control section 220. The operation and display control section 220 causes the LCD 221 to display an operation screen that displays various screens for inputting various setting conditions, results of various types of processing, and the like, in accordance with display signals inputted from the control section 250. In addition, the operation and display control section 220 outputs, to the control section 250, operational signals inputted through various switches and buttons, numeric keypad, an operation key group, a touch panel, or the like.

The printing section 23 includes various sections related to print output, such as the sheet feeding section 231, the sheet conveying section 232, the image forming section 233, the fixing section 234 (refer to FIG. 1) described above, and a printing control section 230. The printing control section 230 controls operations of respective sections including the printing section 23 such as the image forming section 233 in accordance with instructions from the control section 250, to thereby form images on the basis of printing image data inputted from the writing processing section 258.

The controller 24 manages and controls data inputted into the image forming system 1 from the external apparatus 2 connected to the network 3. The controller 24 receives data on the printing target (printing data and print-setting data) from the external apparatus 2, and transmits, to the image control board 25, image data generated by developing the printing data, and the print-setting data.

The controller 24 is constituted of a controller-control section 241, a dynamic random access memory (DRAM) controlling IC 242, an image memory 243, the LANIF 244 and the like. The controller-control section 241 integrally controls operations in each unit of the controller 24, and develops printing data inputted from the external apparatus 2 via the LANIF 244 to thereby generate image data in a bitmap format.

The DRAM controlling IC 242 controls forwarding the printing data received by the LANIF 244 to the controller-control section 241, and writing/reading the image data and the print-setting data to/from the image memory 243. Furthermore, the DRAM controlling IC 242 is connected to a DRAM controlling IC 255 of the image control board 25 through a peripheral components interconnect (PCI) bus. The DRAM controlling IC 242 reads image data and print-setting data which are to be printed, from the image memory 243 in accordance with instructions from the controller-control section 241 to thereby output these data to the DRAM controlling IC 255.

The image memory 243 is constituted of a volatile memory such as a DRAM, and temporarily stores the image data and the print-setting data.

The LANIF 244 is a communication interface for connecting, for example, a network interface card (NIC), modem or the like to the network 3 such as a LAN, and receives printing data and print-setting data from the external apparatus 2. The printing data and the print-setting data received by the LANIF 244 are outputted to the DRAM controlling IC 242.

The image control board 25 includes the control section 250, the non-volatile memory 251, a random access memory (RAM) 252, the reading processing section 253, a compression IC 254, the DRAM controlling IC 255, an image memory 256, a decompression IC 257, the writing processing section 258 and the like.

The control section 250 is constituted of a central processing unit (CPU) and the like, and reads a designated program from among system programs and various application programs stored in the non-volatile memory 251 to thereby develop it in the RAM 252. Then, the control section 250 performs various types of processing to thereby centrally control respective sections in the first image forming apparatus 20 in cooperation with the program developed in the RAM 252.

In addition, since the first image forming apparatus 20 is set as the main apparatus, the control section 250 receives signals indicating states of respective apparatuses from the respective apparatuses constituting the image forming system 1, via the communication section 26. Then, the control section 250 integrally controls the entire image forming system 1 on the basis of these signals indicating states of respective apparatuses. For example, In the case where the control section 250 receives a signal indicating an error (generation of jam, out of paper, and toner deficiency and the like) within the second image forming apparatus 40, the control section 250 generates a display signal or operation instruction signal corresponding to the error to thereby transmit the generated signal, for example, to the operation display section 22, the second image forming apparatus 40 and the like.

Moreover, the control section 250 generates job data and compressed image data on the basis of the image data and the print-setting data inputted from the external apparatus 2 via the controller 24, or image data inputted from the image reading section 21 and setting information set by the operation display section 22. Then, the control section 250 executes a job in cooperation with the second image forming apparatus 40 on the basis of the generated job data and compressed image data.

The job represents a series of operations in connection with image formation, and for example, in the case where a copy including a document of predetermined pages is created, one job is a series of operations related to image formation of the document of the predetermined pages. The job data represents data for executing operations of the job.

The job data includes job information and page information.

The job information is common to all pages. For example, the job information includes information on the number of copies set in the job, a sheet receiving tray, advanced functions (for example, collection and repeat), color/monochrome and the like.

The page information is associated with compressed image data on each page, and represents information related to the associated compressed image data. For example, the page information includes information such as the page number, the size of image (height and length), the orientation of image, the width of image, the rotation angle of image, the type of sheet on which image is formed, a sheet feeding tray on which the sheet is housed, a printing mode (double-sided mode/single-sided mode), and a storage address of the compressed image data.

The non-volatile memory 251 stores various processing programs, various data concerning image formation and the like. In addition, the non-volatile memory 251 stores information on the type of sheet housed on each sheet feeding tray of the sheet feeding apparatus 10, the sheet feeding section 231 of the first image forming apparatus 20, and the sheet feeding section 431 of the second image forming apparatus 40.

The RAM 252 forms a work area for temporarily storing various programs executed by the control section 250, various kinds of data related to these programs and the like. In addition, the RAM 252 temporarily stores job data generated by the control section 250 on the basis of image data and print-setting data, each of which is inputted from the controller 24, or image data inputted from the image reading section 21 and setting information set by the operation display section 22 when the image data is acquired.

The reading processing section 253 applies various types of processing such as analog processing, analog-to-digital conversion processing, and shading processing to analog image data inputted from the image reading section 21, and then generates digital image data. The image data thus generated is outputted to the compression IC 254.

The compression IC 254 applies compression processing to the inputted digital image data, and outputs, to the DRAM controlling IC 255, the digital image data subjected to the compression processing.

The DRAM controlling IC 255 controls compression processing performed on the image data by the compression IC 254 and expansion processing performed on the compressed image data by the decompression IC 257 in accordance with instructions from the control section 250, and controls inputting and outputting of image data with the image memory 256.

For example, when an instruction to store the image data read by the image reading section 21 is inputted from the control section 250, the DRAM controlling IC 255 causes the compression IC 254 to execute compression processing to the image data inputted into the reading processing section 253 to thereby store the compressed image data generated by the compression processing, in the compression memory 256a of the image memory 256. Furthermore, when image data is inputted from the DRAM controlling IC 242 of the controller 24, the DRAM controlling IC 255 causes the compression IC 254 to execute compression processing to the image data to thereby store the compressed image data generated by the compression processing in the compression memory 256a of the image memory 256.

Moreover, when an instruction to print out the compressed image data stored in the compression memory 256a is inputted from the control section 250, the DRAM controlling IC 255 reads the compressed image data from the compression memory 256a, and causes the decompression IC 257 to apply expansion processing to the read compressed image data to thereby store the image data subjected to the expansion processing in the page memory 256b. In addition, when an instruction to print out the image data stored in the page memory 256b is inputted from the control section 250, the DRAM controlling IC 255 reads the image data from the page memory 256b to thereby output the image data to the writing processing section 258.

The image memory 256 includes the compression memory 256a and the page memory 256b, each of which is constituted of a dynamic RAM (DRAM). The compression memory 256a is a memory for storing compressed image data, and the page memory 256b is a memory for temporarily storing image data for print output, or for temporarily storing image data received from the controller 24 before the image data is compressed.

The decompression IC 257 applies expansion processing to compressed image data.

The writing processing section 258 generates printing image data for image formation on the basis of image data inputted from the DRAM controlling IC 255, and outputs the generated printing image data to the printing section 23.

The communication section 26 serves as a communication interface for connecting the first image forming apparatus 20 to a network obtained by connecting each of the apparatuses constituting the image forming system 1. For example, the communication section 26 uses, for example, an NIC to communicate with the second image forming apparatus 40, and to perform serial communication with the sheet feeding apparatus 10 and the intermediate apparatus 30.

The density sensor 27 is one example of a density detecting section that detects a density (image density) of a toner image formed on an image carrier (a photoreceptor section and an intermediate transferring section). The density sensor 27 includes a light emitting section that emits light toward the image carrier, and a light receiving section that receives the light reflected from the image carrier based on the emitted light, and supplies the control section 250 with information on the detected density. Once the control section 250 receives the density information supplied from the density sensor 27, the control section 250 performs image stabilizing control, which will be described later, on the basis of the density information.

[Internal Configuration of Second Image Forming Apparatus]

Figure 3:
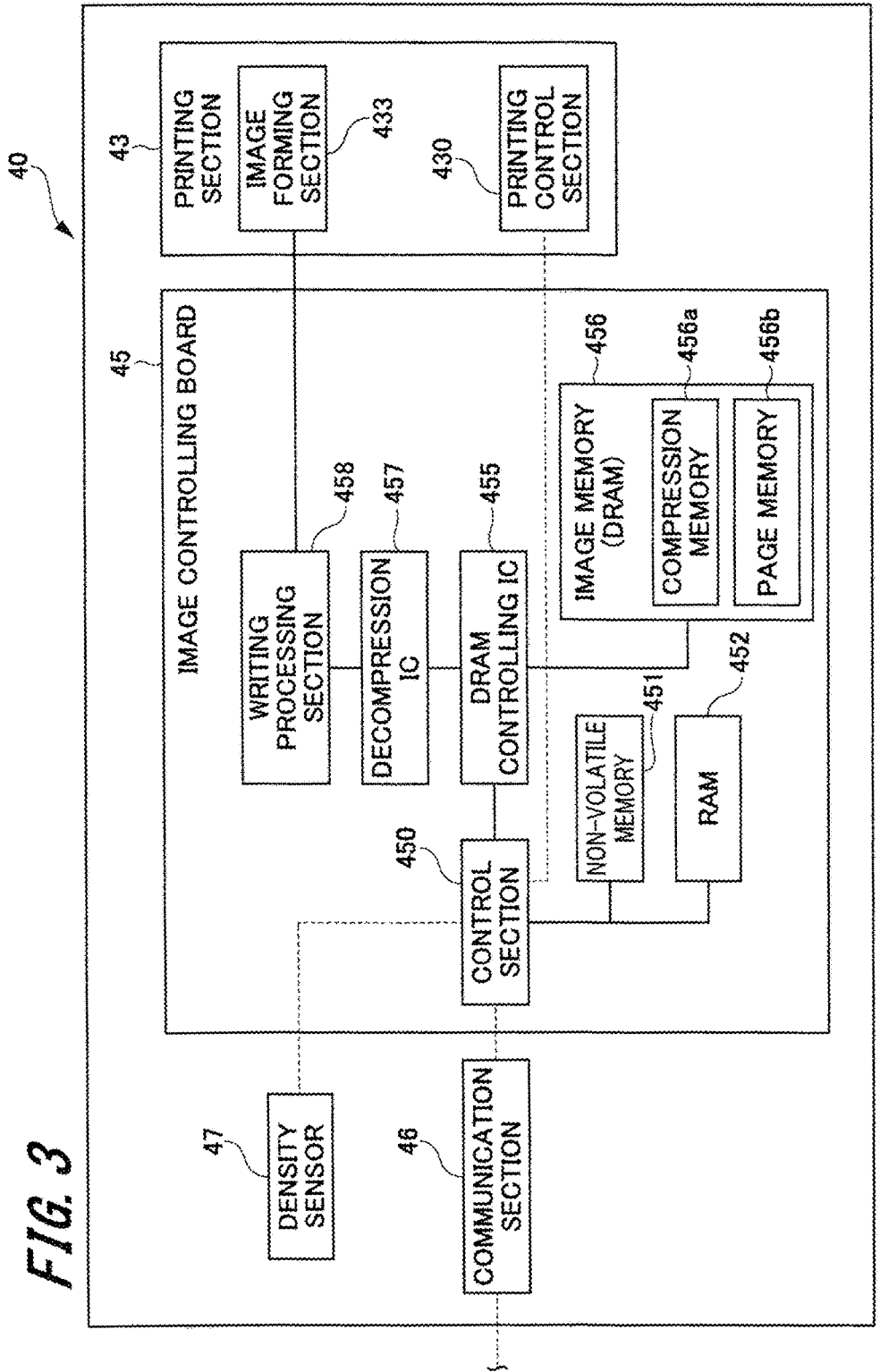
FIG. 3 is a block diagram illustrating the internal configuration of a second image forming apparatus in the image forming system according to the embodiment.

FIG. 3 is a block diagram illustrating the internal configuration of the second image forming apparatus 40 in the image forming system 1 according to the embodiment. As illustrated in FIG. 3, the second image forming apparatus 40 is constituted by including, for example, the printing section 43, an image control board 45, a communication section 46, and a density sensor 47.

The printing section 43 includes a printing control section 430 and an image forming section 433, which correspond to the printing control section 230 and the image forming section 233, respectively, of the printing section 23 of the first image forming apparatus 20. The printing control section 430 and the image forming section 433 have similar configurations to the printing control section 230 and the image forming section 233, respectively, of the printing section 23 of the first image forming apparatus 20, and thus explanation thereof will be omitted.

The image control board 45 includes, for example, a control section 450, a non-volatile memory 451, a RAM 452, a DRAM controlling IC 455, an image memory 456, a decompression IC 457, a writing processing section 458, and the like.

The control section 450 is constituted of a CPU and the like, and reads a designated program from between system programs and various application programs stored in the non-volatile memory 451 to thereby develop them in the RAM 452. Then, the control section 450 executes various types of processing to thereby centrally control each section in the second image forming apparatus 40 and the intermediate apparatus 30 in cooperation with the programs developed in the RAM 452.

The non-volatile memory 451 stores various processing programs and various data related to image formation. In addition, the non-volatile memory 451 stores information on the type of sheet housed on each sheet feeding tray of the sheet feeding apparatus 10, the sheet feeding section 231 of the first image forming apparatus 20, and the sheet feeding section 431 of the second image forming apparatus 40.

The RAM 452 forms a work area for temporarily storing various programs executed by the control section 450, various kinds of data related to these programs, and the like.

In addition, the RAM 452 temporarily stores data inputted from the first image forming apparatus 20 through the communication section 46.

The DRAM controlling IC 455 controls expansion processing of compressed image data by the decompression IC 457 in accordance with instructions from the control section 450, and performs input/output control of image data on the image memory 456.

For example, when job data and compressed image data are inputted from the communication section 46, the DRAM controlling IC 455 causes the job data and the compressed image data to be stored in the RAM 452 and the compression memory 456a of the image memory 456, respectively.

Furthermore, when an instruction to print out the compressed image data stored in the compression memory 456a is inputted from the control section 450, the DRAM controlling IC 455 reads the compressed image data from the compression memory 456a, and causes the decompression IC 457 to apply expansion processing to thereby store, in the page memory 456b, the image data subjected to the expansion processing. In addition, if an instruction to print out the image data stored in the page memory 456b is inputted from the control section 450, the DRAM controlling IC 455 reads the image data from the page memory 456b to thereby output the data to the writing processing section 458.

The image memory 456 includes the compression memory 456a and the page memory 456b, each of which is constituted of a DRAM. The compression memory 456a is a memory for storing compressed image data, and the page memory 456b is a memory for temporarily storing image data for print output.

The decompression IC 457 applies expansion processing to the compressed image data.

The writing processing section 458 generates printing image data for image formation on the basis of the image data inputted from the DRAM controlling IC 455, and outputs the generated printing image data to the printing section 43.

The communication section 46 serves as a communication interface for connecting the second image forming apparatus 40 to a network obtained by connecting each of the apparatuses constituting the image forming system 1. For example, the communication section 46 uses, for example, an NIC to perform communication with the first image forming apparatus 20, or to perform serial communication with the intermediate apparatus 30 and the post-processing device 50.

The density sensor 47 is one example of a density detecting section that detects a density (image density) of a toner image formed on an image carrier (a photoreceptor section and an intermediate transferring section). The density sensor 47 includes alight emitting section that emits light toward the image carrier, and a light receiving section that receives the light reflected from the image carrier based on the emitted light, and supplies information on the detected density to the control section 450. Once the control section 450 receives the density information supplied from the density sensor 47, the control section 450 performs image stabilizing control, which will be described later, on the basis of the density information from the density sensor 47, as with the control section 250 of the first image forming apparatus 20.

[Image Stabilizing Control]

The first image forming apparatus 20, which employs an electrophotographic system, performs image stabilizing control in which, on the basis of information on a density detected by the density sensor 27, conditions for image formation in the image forming section 233 are adjusted under control by the control section 250 so that the density of a formed image (namely, output image) becomes a target density. The number of rotation of a development roller, exposure time, development bias voltage and the like can be exemplified as the condition for image formation. The second image forming apparatus 40, which employs an electrophotographic method, performs image stabilization control for adjusting conditions for image formation in the image forming section 433 under control by the control section 450 on the basis of information on a density detected by the density sensor 47, as with the first image forming apparatus 20.

The image stabilizing control is performed, by the first image forming apparatus 20 and the second image forming apparatus 40, between images (between sheets) formed on the image carrier (photoreceptor or intermediate transfer body) during printing operations (print job) in each of the first image forming apparatus 20 and the second image forming apparatus 40. Specifically, the image stabilizing control is performed in such a manner that: a pattern image for image density control is formed on each of the image carriers between images; the density of the pattern image is detected by each of the density sensor 27 and the density sensor 47; and the detected information (density information) is fed back to conditions for image formation, and is reflected to the condition for image formation. Here, the "pattern image for image density control" represents a patchy toner image (hereinafter, referred to as a "toner patch image") exclusively formed for controlling (adjusting) the image density. The image stabilizing control makes it possible to stably form images even when there is a factor that makes image formation instable.

In the image stabilizing control, there is performed adjustment of the maximum density, based on the density of a toner patch image for adjusting the maximum density, formed on the image carrier. The adjustment processing of the maximum density is performed in such a manner that the density sensors 27 and 47 measure the density of the toner patch image for maximum density formed on the image carrier, and the number of rotation of the development roller is controlled so that the density of the toner patch image becomes a target density. For example, when the amount of toner attached is determined to be less than the target amount, control is performed so as to increase the number of rotation of the development roller, and when the amount of toner attached is determined to be larger than the target amount, control is performed so as to reduce the number of rotation of the development roller. Such control makes it possible to keep constant the amount of toner attached on the image carrier.

In the adjustment processing for the maximum density described above, the maximum density is adjusted by controlling the number of rotation of a development roller. However, instead of controlling the number of rotation of a development roller, it is possible to adjust the maximum density by controlling the development bias voltage, namely, controlling a development field. When the amount of toner of a toner patch image for halftone density attached on the image carrier is determined to be low, the exposure time is controlled to be long, whereas when the amount of toner attached is high, the exposure time is controlled to be short. Here, for example, the maximum density is regularly adjusted every 10p (p represents the number of prints), and the halftone density is regularly adjusted every 100p between images where the maximum density is not adjusted.

[Density Correction Control]

In addition to the image stabilizing control, the first image forming apparatus 20 and the second image forming apparatus 40 perform density correction control through a sequence different from that for print job. Specifically, the density correction control is executed, for example, at the time of starting up the image forming system 1 (hereinafter, referred to as "at the time of system start-up"), or by regularly stopping printing procedure during printing.

The image stabilizing control is a density adjustment between images, namely, a density adjustment on the basis of the density of a toner patch image formed between images. Since the area between images is narrow, the number of toner patch images that can be formed in the area between the images is limited to approximately one image, in some times. In contrast to this, in the case of the density correction control, because the density correction control is performed through a sequence different from that for print job, there is no limitation of forming the toner patch image between images, and thus multiple toner patch images can be formed. Accordingly, it is possible to correct the image density by using more density information on the basis of a plurality of toner patch images.

In the case of the density correction control, halftone density is adjusted on the basis of the density of a toner patch image for adjusting halftone density formed on the image carrier. Adjustment processing of the halftone density is performed in such a manner that a toner patch image for halftone density is formed on the image carrier; the density sensors 27 and 47 detect the density of the toner patch image; and a screen is selected so that the density of the toner patch image has a target density (a target density curve).

The image density is corrected by performing correction through image processing on the basis of information on densities detected by the density sensors 27 and 47, for example, by correcting a gamma curve (so-called γ correction). Note that γ correction is for correcting a correlation between the gradation value of an inputted image and the gradation value of an actual outputted image.

[Density Difference Between Front and Back Sides of Sheet]

In the tandem-type image forming system 1, a density difference will be generated between the image formed on the front side of a sheet and the image formed on the back side in the case where the density of an image formed by the first image forming apparatus 20 is not equal to that of an image formed by the second image forming apparatus 40. Even in the case where the image density correction is performed at the time of system start-up or on a regular basis to thereby adjust maximum densities and halftone densities, the relationship between the maximum density and the halftone density changes when states of developers of two image forming apparatuses 20 and 40 change due to, for example, deviation or the like of output coverage after the correction, with the result that the density difference becomes more conspicuous. Here, the "output coverage" represents a ratio of an output image (image to be formed) relative to the image formation area on a sheet.

Densities vary by the change in the states of a developer during printing due to, for example, change in coverage rate of an output object (output sheet), and thus the density adjusted at the time of system start-up gradually shifts from the target density. Although the density is corrected between images, density control of the maximum density interferes with density control of the halftone density, and thus there are some cases where it is difficult to maintain both the maximum density and the halftone density so as to be the target densities.

The present inventors conducted the following experiments in order to inspect the density difference between the image on the front side of a sheet and the image on the back side generated between the first image forming apparatus 20 and the second image forming apparatus 40. In the following description, explanation will be carried out by assuming that the first image forming apparatus 20 is the upstream apparatus, and the second image forming apparatus 40 is the downstream apparatus.

First, the density correction control was performed at the time when power supply was inputted into the system. The output coverage of both of the upstream apparatus and the downstream apparatus was set to be, for example, 8% document, just before the input of power supply. After the density correction control was performed, the upstream apparatus outputted an image having a small consumption amount of toner (for example, coverage 3%), and the downstream apparatus outputted an image having a large consumption amount of toner (for example, coverage 20%). Then, change in densities of images formed by the upstream apparatus and the downstream apparatus was checked.

In the case where the consumption amount of toner is low, additives for ensuring transfer performance of toner are more likely to be released or be buried, and thus fluidity of a developer is reduced or transfer performance is deteriorated, thereby leading to a reduction in image density on a sheet. In the case where the consumption amount of toner is high, a large amount of toner is supplied, and residence time for the toner becomes short and also mixing time becomes short, in the development unit, with the result that the charge amount of toner becomes short, leading to a change in development properties. When development properties change, the width of a line is increased in the case where the maximum densities are made equal, and thus a halftone density is increased in an image forming apparatus which forms a halftone density by utilizing screen images.

Through the experiments, it was confirmed, as shown in Table 1, that a density difference in the case of 70% density is increased to 0.18 in terms of reflection density, by performing control for adjusting maximum densities and half tone densities, with the maximum density being given a priority. Table 1 shows transitions of densities in terms of reflection density and density differences up to 4000p. It was confirmed that the density difference in terms of reflection density in the case of 70% density is increased to 0.18 in a range of 3001 to 3500p. In particular, although the density difference in the case of 70% density up to 1500p was as low as 0.11, the density difference in the case of 70% density is as large as 0.15 in a range of 1501 to 2000p.

upstream apparatus and the downstream apparatus. Furthermore, the timing for performing the density correction control is determined on the basis of information corresponding to the density difference between images formed by the upstream apparatus and the downstream apparatus.

As is clear from the results of the experiments described above, the density difference between images formed by the upstream apparatus and the downstream apparatus (density difference between images on front and back sides of a sheet) is more likely to be generated as a difference in coverage of a developer between the upstream apparatus and the downstream apparatus becomes larger. Thus, information on coverage of developers of the upstream apparatus and the downstream apparatus can be used as information corresponding to a density difference between images formed by the upstream apparatus and the downstream apparatus. In addition, when image stabilizing control is performed in each of the upstream apparatus and the downstream apparatus, density information on a toner patch image detected between images by the density sensor 27 and the density sensor 47 can be used as information correspond-

TABLE 1

| | | | Transition of reflection density | | | | | | | |
|---|---|---|---|---|---|---|---|---|---|---|
| | | | 0-500p | 501-1000p | 1001-1500p | 1501-2000p | 2001-2500p | 2501-3000p | 3001-3500p | 3501-4000p |
| Document | | Upstream apparatus | 3% | 3% | 3% | 3% | 3% | 3% | 3% | 3% |
| | | Downstream apparatus | 20% | 20% | 20% | 20% | 20% | 20% | 20% | 20% |
| Density | Maximum density | Upstream apparatus | 1.50 | 1.50 | 1.53 | 1.52 | 1.52 | 1.50 | 1.52 | 1.51 |
| | | Downstream apparatus | 1.51 | 1.49 | 1.51 | 1.50 | 1.50 | 1.52 | 1.49 | 1.50 |
| | 70% density | Upstream apparatus | 0.86 | 0.84 | 0.83 | 0.82 | 0.82 | 0.82 | 0.81 | 0.81 |
| | | Downstream apparatus | 0.84 | 0.90 | 0.94 | 0.97 | 0.97 | 0.98 | 0.99 | 0.99 |
| Density difference | | Maximum density | 0.01 | 0.01 | 0.02 | 0.02 | 0.02 | 0.02 | 0.03 | 0.01 |
| | | 70% density | 0.02 | 0.06 | 0.11 | 0.15 | 0.15 | 0.16 | 0.18 | 0.18 |

TABLE 2

| Coverage | 3% | 5% | 10% | 20% | 30% |
|---|---|---|---|---|---|
| 1000p | −0.02 | 0 | 0.04 | 0.06 | 0.08 |
| 2000p | −0.04 | 0.01 | 0.08 | 0.13 | 0.15 |
| 4000p | −0.05 | 0.01 | 0.09 | 0.15 | 0.17 |

Table 2 shows the amount of change in density with respect to coverage at 1000p, 2000p, and 4000p. Density tends to be decreased in the case of the low coverage, whereas density tends to be increased in the case of the high coverage. Therefore, it can be found that a density difference between upstream and downstream apparatuses is more likely to be generated as a coverage difference is increased. Accordingly, the number of prints until a density difference reaches a certain threshold value becomes smaller.

[Timing for Performing Density Correction Control]

From the results of the experiments described above, it is obvious that, even when density correction control is performed at the start of power supply to the system (at the time of system start-up), a density difference is generated between images on front and back sides of the sheet, namely, between images formed by the upstream apparatus and the downstream apparatus, due to deviation or the like of output coverage after the density correction control, and the like. Accordingly, in the embodiment, density correction control is performed not only at the time of starting power supply to the system, but also in the middle of a print job, in order to reduce the density difference between images formed by the ing to a density difference between images formed by the upstream apparatus and the downstream apparatus.

Hereinafter, there will be described Example 1 in which coverage information on developers of the upstream apparatus and the downstream apparatus is used as information corresponding to a density difference between images formed by the upstream apparatus and the downstream apparatus, and Example 2 in which density information on a toner patch image detected between images is used. In addition, Example 3 will be described as a modification of Example 2.

Example 1

In Example 1, the timing for performing the density correction control is determined on the basis of coverage information on developers of the upstream apparatus and the downstream apparatus. The coverage information on a developer represents, for example, a use history (coverage rate) of the developer, and can be obtained on the basis of information on dots exposed and recognized by each of the control section 250 of the first image forming apparatus 20 (refer to FIG. 2) and the control section 450 of the second image forming apparatus 40 (refer to FIG. 3).

The timing for performing the density correction control is set before the density difference generated between images (images on front and back sides of a sheet) formed by the upstream apparatus and the downstream apparatus reaches a predetermined threshold value or larger. It is possible to adjust maximum densities and halftone densities before the density difference becomes larger than the predetermined threshold value, by performing the density correction control at the set timing, and thus the density difference does not become larger than the predetermined threshold value. In other words, the density difference can be suppressed to be smaller than the predetermined threshold value.

In order to more correctly determine the timing for performing the density correction control, it is preferable to employ the following method. Namely, in each of the upstream apparatus and the downstream apparatus, it is preferable to calculate a difference between coverage information at the time of the density correction control performed this time and information on coverage history at the time of the density correction control performed in the previous time. Then, a difference between the calculated values of the upstream apparatus and the downstream apparatuses is used as a difference in coverage change, in order to determine the timing for performing the density correction control.

In Example 1, the timing for performing the density correction control is set in the following manner on the basis of information on coverage of developers of the upstream apparatus and the downstream apparatus. As to the coverage, the average value of coverage, for example, for each 100p is calculated, and the average value of the coverage of, for example, 40 times (coverage for 4000p in total) is stored. The data stored is updated every time coverage for each 100p is calculated, and the latest data for 4000p is used in order to determine the timing for performing the density correction control.

The coverage and the amount of change in density do not have a linear relationship, and thus the amount of change in density for each coverage at 1000p, 2000p, and 4000p is experimentally obtained in advance. Then, the density difference between images formed by the upstream apparatus and the downstream apparatus is estimated from the amount of change in density for each coverage at 1000p, 2000p, and 4000p.

Figure 4A:
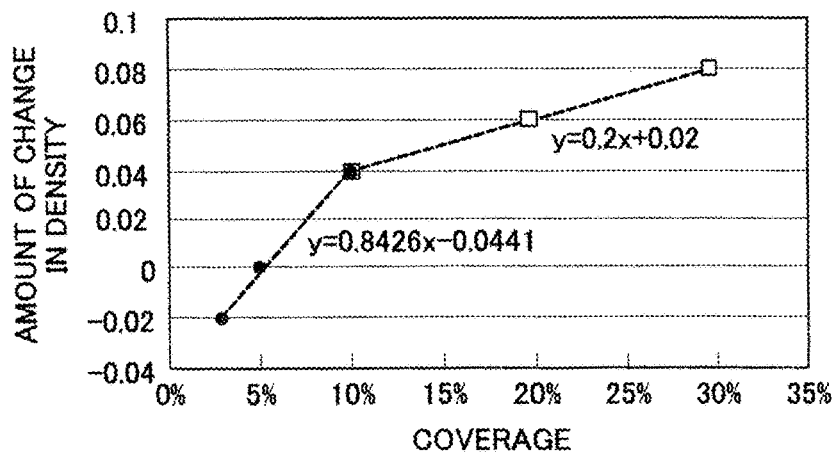
FIGS. 4A to 4C are diagrams each illustrating a relationship between coverage and the amount of change in density.
Figure 4B:
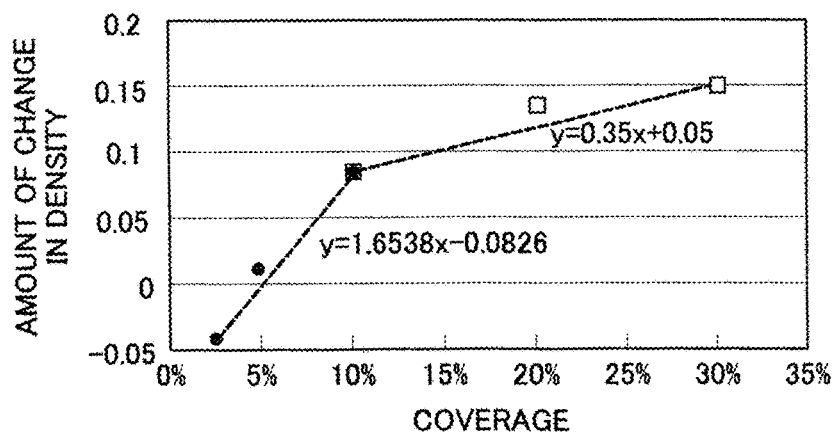
Figure 4C:
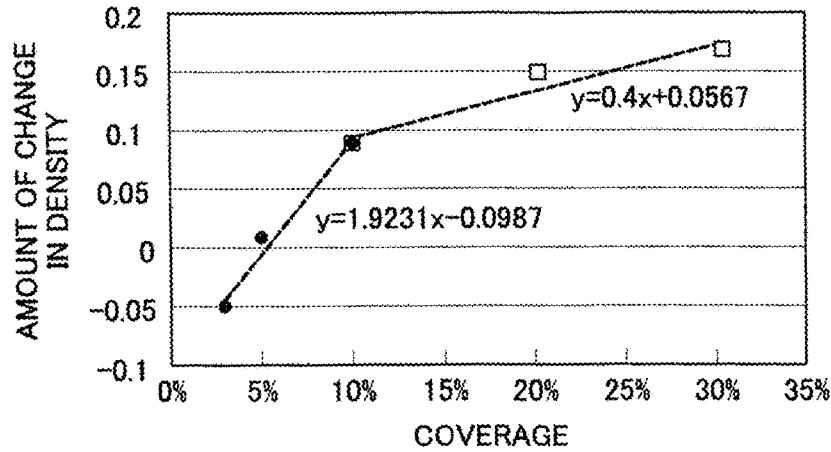

FIGS. 4A to 4C are diagrams each illustrating a relationship between the coverage and the amount of change in density. FIG. 4A is a graph showing the amount of change in density after 1000p, FIG. 4B is a graph showing the amount of change in density after 2000p, and FIG. 4C is a graph showing the amount of change in density after 4000p.

In FIGS. 4A, 4B, and 4C, the range of coverage is divided into two sections of the coverage of 10% or less and the coverage of 10% or more, and a linear approximate expression in the graph for each section is obtained. Then, the estimated value of the density difference obtained from the approximate expressions is calculated, and when the estimated value of the density difference exceeds a predetermined threshold value (first threshold value), the density correction control is executed. Note that, since results of the coverage higher than 30% are the same as results at the time of 30% coverage output, calculation is performed by assuming that the coverage higher than 30% is the coverage 30%.

Figure 5:
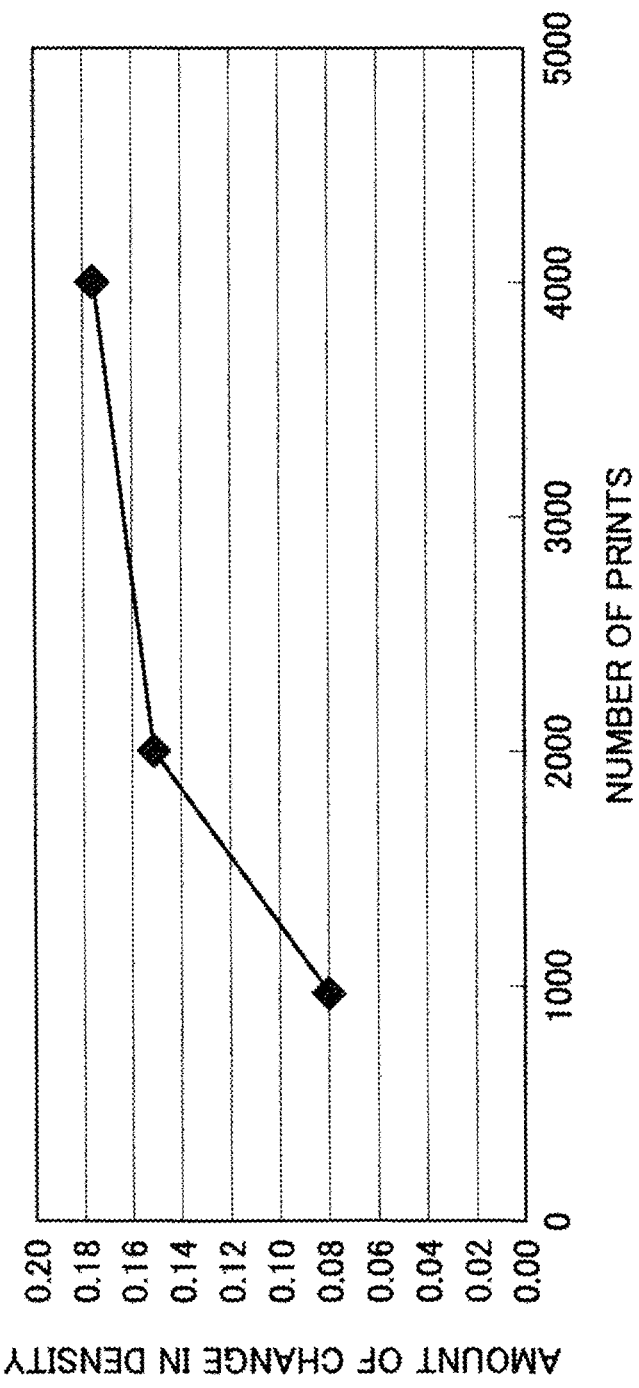
FIG. 5 is a diagram illustrating the estimated density difference relative to the number of prints in the case where 3% coverage and 20% coverage are outputted.

From FIGS. 4A, 4B, and 4C, in the case where coverage of 3% and coverage of 20% are outputted, the amount of change in density relative to the number of prints can be obtained as shown in FIG. 5. From FIG. 5, it is found that the density correction control needs to be performed before approximately 2000p in order to suppress the density difference so as to be less than a predetermined threshold value, for example, 0.15. The density difference can be suppressed to be less than 0.15 by performing the density correction control at 1900p, which is determined from the coverage on the basis of the data described above.

Figure 6:
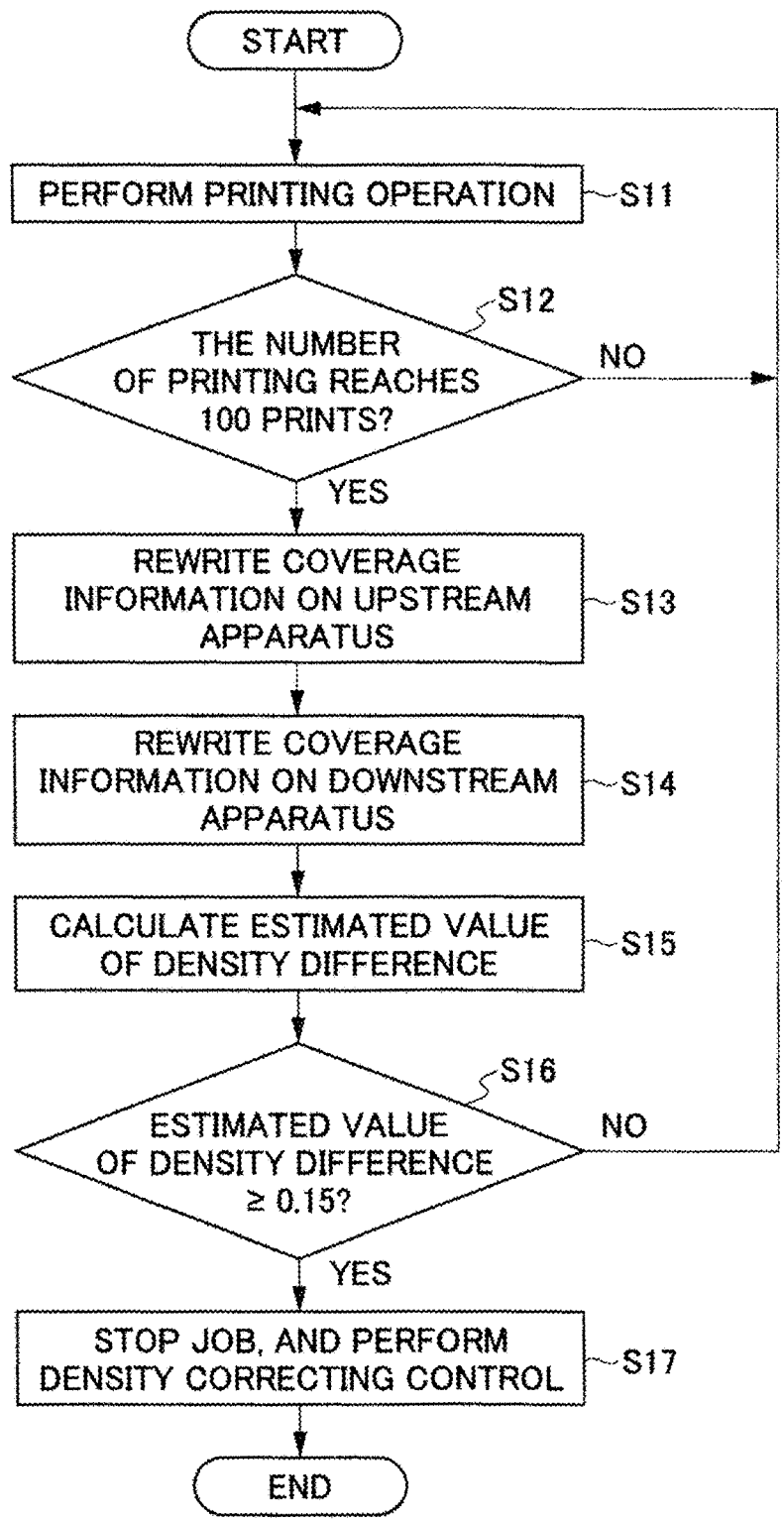
FIG. 6 is a flowchart showing processes in an image forming method according to Example 1.

FIG. 6 is a flowchart showing processes in an image forming method according to Example 1. These processes are executed under control by, for example, the control section 250 of the first image forming apparatus 20 (refer to FIG. 2). The control may be performed by the external apparatus 2 (refer to FIG. 2) or the control section 450 of the second image forming apparatus 40 (refer to FIG. 3), in addition to the control section 250 of the first image forming apparatus 20.

The control section 250, first, causes the upstream apparatus (first image forming apparatus 20) and the downstream apparatus (second image forming apparatus 40) to perform printing operations (step S11). Next, the control section 250 determines whether or not the number of prints reaches a predetermined value, for example, 100 prints (step S12), and when the control section 250 determines that the number of prints does not reach 100 prints (NO in S12), the procedure returns to step S11. When the control section 250 determines that the number of prints reaches 100 prints (YES in S12), the control section 250 rewrites the coverage information on the upstream apparatus (step S13), and then, rewrites the coverage information on the downstream apparatus (step S14).

Subsequently, the control section 250 calculates an estimated value of a density difference through the method described above (step S15), and then, determines whether the estimated value of a density difference is a predetermined threshold value (for example, 0.15) or larger (step S16). When the control section 250 determines that the estimated value of a density difference is not the threshold value or larger (NO in S16), the procedure returns to step S11, and repeats processes from step S11 to step S16. When the control section 250 determines that the estimated value of a density difference is the threshold value or larger (YES in S16), the control section 250 stops the job, and then performs the density correction control (step S17).

As described above, Example 1 employs the control in which a state where a density difference is generated due to coverage is estimated, and the estimated state is fed back at the timing for performing the density correction control. Specifically, the density correction control is performed at the timing when the estimated value of the density difference between images formed by the upstream apparatus and the downstream apparatus is a predetermined threshold value (for example, 0.15) or larger. Through the control, the density difference between images formed by the upstream apparatus and the downstream apparatus (density difference between images between front and back sides of a sheet) can be suppressed to be less than 0.15.

Example 2

In Example 2, the timing for performing the density correction control is determined on the basis of information on densities of toner patch images detected between images at the time of image stabilizing control. Specifically, the density correction control is performed at the timing when a density difference in the case of 70% density between a density of a toner patch image detected by the density sensor 27 of the upstream apparatus and a density of a toner patch image detected by the density sensor 47 of the downstream apparatus is a predetermined threshold value (for example, 0.15) or larger. In experiments, the timing when the density difference in the case of 70% density reaches 0.15 or larger is the time of 1800 prints, and the density correction control was performed at the time of 1800 prints.

In the case where the density correction control is not performed, the density difference in the case of 70% density was 0.15 in a range of 1501 to 2500p, 0.16 in a range of 2501 to 3000p, and 0.18 in a range of 3001 to 4000p as shown in Table 1. In contrast to this, in the case where the density correction control was performed at the time of 1800p, the density difference in the case of 70% density resulted in 0.01 in a range of 1501 to 2500p and 0.03 in a range of 2501 to 4000p as shown in Table 3, which gave stable densities of images on front and back sides of a sheet.

TABLE 3

|  |  |  | Transition of reflection density | | | | | | | |
| --- | --- | --- | --- | --- | --- | --- | --- | --- | --- | --- |
|  |  |  | 0-500p | 501-1000p | 1001-1500p | 1501-2000p | 2001-2500p | 2501-3000p | 3001-3500p | 3501-4000p |
| Document |  | Upstream apparatus | 3% | 3% | 3% | 3% | 3% | 3% | 3% | 3% |
|  |  | Downstream apparatus | 20% | 20% | 20% | 20% | 20% | 20% | 20% | 20% |
| Density | Maximum density | Upstream apparatus | 1.50 | 1.50 | 1.53 | 1.52 | 1.52 | 1.50 | 1.52 | 1.51 |
|  |  | Downstream apparatus | 1.51 | 1.49 | 1.51 | 1.50 | 1.50 | 1.52 | 1.49 | 1.50 |
|  | 70% density | Upstream apparatus | 0.86 | 0.84 | 0.83 | 0.82 | 0.82 | 0.82 | 0.81 | 0.81 |
|  |  | Downstream apparatus | 0.84 | 0.90 | 0.94 | 0.86 | 0.86 | 0.87 | 0.87 | 0.87 |
| Density difference | Maximum density |  | 0.01 | 0.01 | 0.02 | 0.02 | 0.02 | 0.02 | 0.03 | 0.01 |
|  | 70% density |  | 0.02 | 0.06 | 0.11 | 0.01 | 0.01 | 0.03 | 0.03 | 0.03 |

In the density correction control described above, even when the change in density in the case of 70% density of each of the upstream apparatus and the downstream apparatus (image forming apparatuses) is less than the threshold value of 0.15, it is possible to determine that the density difference is more than or equal to the threshold value in the case where the density of each of the upstream apparatus and the downstream apparatus changes toward the opposite side to each other with respect to the target density. Specifically, in the case where the density correction control is not performed, which is shown in Table 1, the density in the case of 70% density of the downstream apparatus changes from 0.84 which is in a range of 0 to 500p, to 0.97 which is in a range of 1501 to 2500p, and the amount of change in density +0.13 is less than 0.15. In contrast to this, the density in the case of 70% density of the upstream apparatus changes from 0.86 which is in a range of 0 to 500p, to 0.82 which is in a range of 1501 to 2500p, toward the opposite side to the change in density of the downstream apparatus, and the density difference is 0.15 in a range of 1501 to 2000p, and thus it is possible to determine that the density difference is more than or equal to the threshold value.

Figure 7:
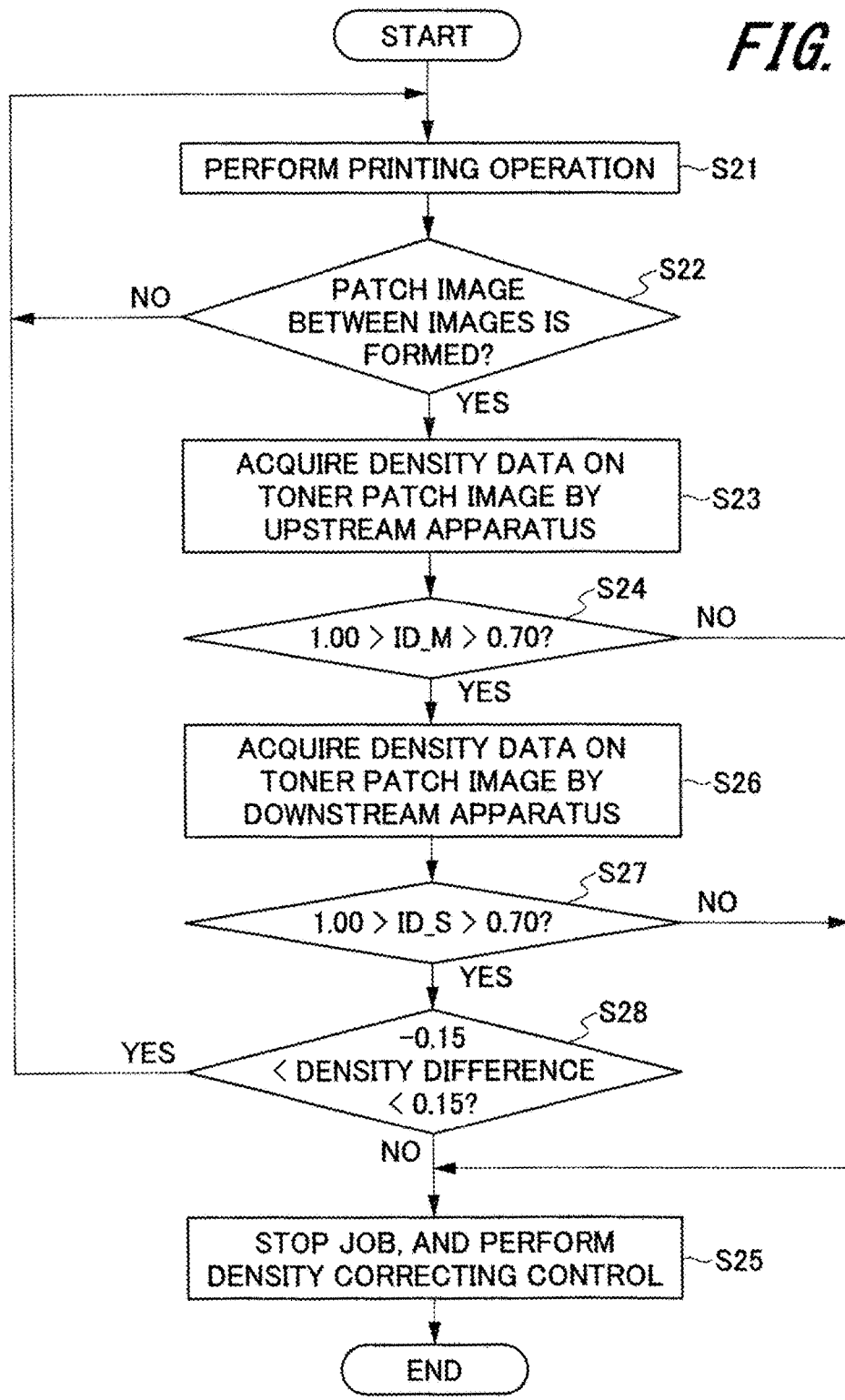
FIG. 7 is a flowchart showing processes in an image forming method according to Example 2.

FIG. 7 is a flowchart showing processes in an image forming method according to Example 2. These processes are performed under, for example, control by the control section 250 of the first image forming apparatus 20 (refer to FIG. 2). The control can also be executed by the external apparatus 2 (refer to FIG. 2) or the control section 450 of the second image forming apparatus 40 (refer to FIG. 3), in addition to the control section 250 of the first image forming apparatus 20.

The control section 250, first, performs printing operations (print job) (step S21), and then, the control section 250 determines whether or not a toner patch image is formed on the image carrier between images (step S22). One toner patch image is formed, for example, once for every 10p. In the case where the control section 250 determines that no toner patch image is formed (NO in S22), the procedure returns to step S21, and in the case where the control section 250 determines that a toner patch image is formed (YES in S22), the control section 250 acquires density data ID_M in the case of 70% density on the toner patch image by the upstream apparatus (step S23).

Then, the control section 250 determines whether or not the density data ID_M on the toner patch image by the upstream apparatus falls within an allowable range (for example, the upper limit of the density is 1.00 and the lower limit of the density is 0.70) (step S24). Furthermore, in the case where the control section 250 determines that the density data ID_M falls outside of the allowable range (NO in S24), the control section 250 stops the job, and performs the density correction control (step S25). Moreover, in the case where the control section 250 determines that the density data ID_M falls within the allowable range (YES in S24), the control section 250 acquires density data ID_S in the case of 70% density on the toner patch image by the downstream apparatus (step S26).

Next, the control section 250 determines whether or not the density data ID_S on the toner patch image by the downstream apparatus falls within an allowable range (for example, the upper limit of the density is 1.00, and the lower limit of the density is 0.70) (step S27). Furthermore, in the case where the control section 250 determines that the density data ID_S falls outside of the allowable range (NO in S27), the procedure moves to step S25, and the control section 250 stops the job and performs the density correction control. Moreover, in the case where the control section 250 determines that the density data ID_S falls within the allowable range (YES in S27), the control section 250 determines whether or not a density difference (ID_M−ID_S) between images formed by the upstream apparatus and the downstream apparatus falls within an allowable range (for example, the upper limit of the density difference is 0.15 and the lower limit of the density difference is −0.15) (step S28).

In addition, in the case where the control section 250 determines that the density difference between images formed by the upstream apparatus and the downstream apparatus falls within the allowable range, in other words, is less than 0.15 (YES in S28), the procedure returns to step S21, and the control section 250 repeats the processes from step S21 to step S28. Furthermore, in the case where the control section 250 determines that the density difference between images formed by the upstream apparatus and the downstream apparatus falls outside of the allowable range, in other words, is more than or equal to 0.15 (NO in S28), the procedure moves to step S25, and the control section 250 stops the print job and performs the density correction control.

As described above, Example 2 employs the control in which the density correction control is performed in the case where the amount of shift of density from the target value in either the upstream apparatus or the downstream apparatus falls outside of the allowable rage, and furthermore, the density correction control is performed at the timing when the density difference between images formed by the upstream apparatus and the downstream apparatus reaches more than or equal to a predetermined threshold value (for example, 0.15). The control makes it possible to suppress the density difference between images formed by the upstream apparatus and the downstream apparatus (density difference between images between front and back sides of a sheet) so as to be less than 0.15.

Example 3

Example 3 is a modification of Example 2. In Example 2, productivity may be deteriorated when the density correction control is frequently performed through a sequence different from that for print job. Example 3 is carried out in order to prevent the deterioration in productivity.

Figure 8:
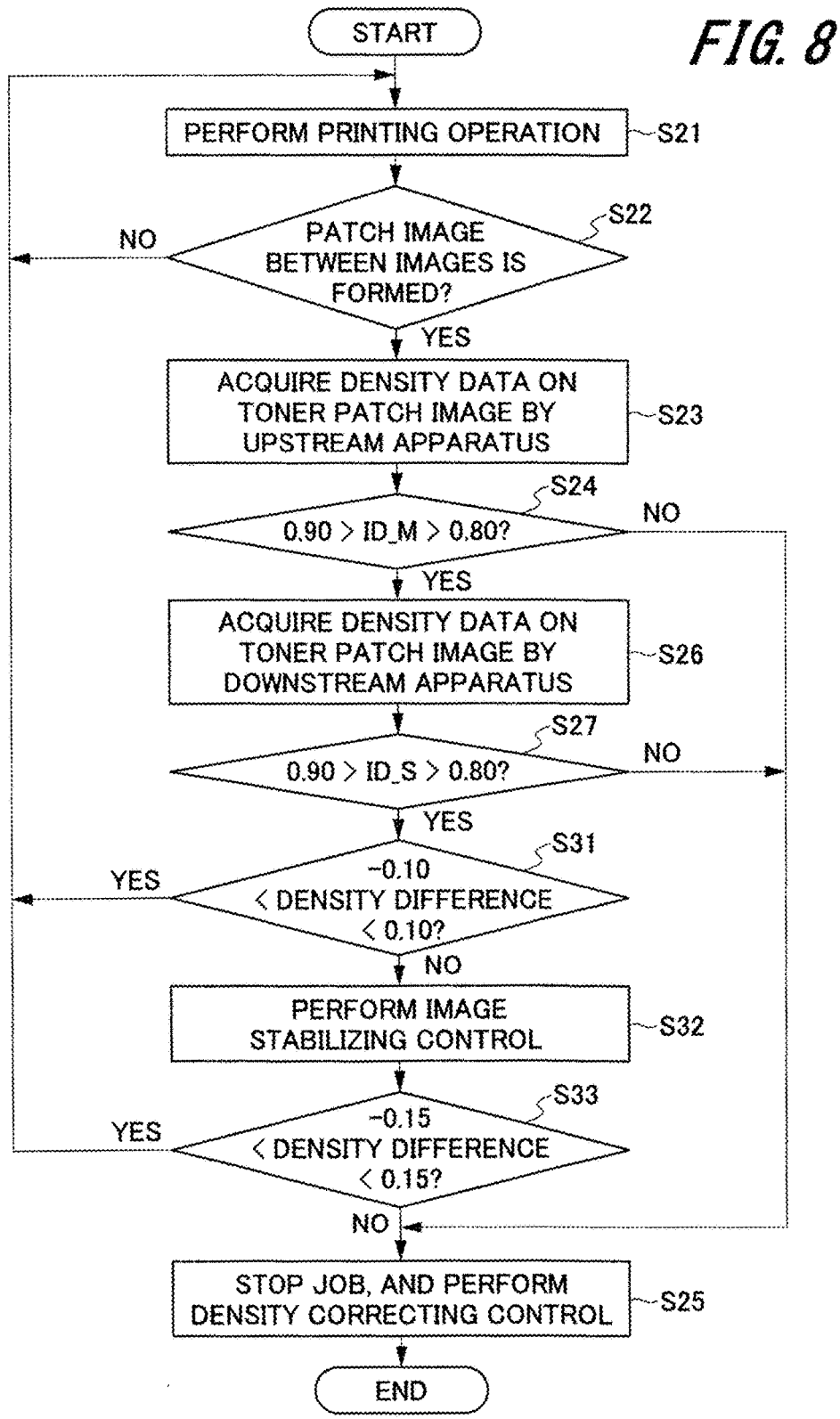
FIG. 8 is a flowchart showing processes in an image forming method according to Example 3.

FIG. 8 is a flowchart showing processes in an image forming method according to Example 3. As to processes from step S21 to step S27, the density correction control is performed in the case where the amount of shift of density from the target value in either the upstream apparatus or the downstream apparatus falls outside of an allowable range, as with Example 2. After that, the control section 250 determines whether or not the density difference (ID_M–ID_S) between images formed by the upstream apparatus and the downstream apparatus is narrower than the allowable range with which the density correction control is performed, for example, the density difference falls within the allowable range in which, for example, the upper limit of the density difference is 0.10 (an example of the second threshold value) and the lower limit of the density difference is −0.10 (an example of the second threshold value) (step S31).

Then, in the case where the control section 250 determines that the density difference between images formed by the upstream apparatus and the downstream apparatus falls within the allowable range, in other words, the density difference is less than 0.10 (YES in S31), the procedure returns to step S21, and the control section 250 repeats processes from step S21 to step S31. In the case where the control section 250 determines that the density difference between images formed by the upstream apparatus and the downstream apparatus falls outside of an allowable range, in other words, the density difference is more than or equal to 0.10 (NO in S31), the control section 250 performs the image stabilizing control described above (step S32).

In the image stabilizing control, as an ordinary state, for example when the maximum density is to be emphasized, the maximum density is detected at intervals of 10p and the halftone density is detected at intervals of 100p, and the control parameters (conditions for image formation) are controlled based on the density information. In contrast, in step S32, the image stabilizing control is performed such that the frequency of measurement of halftone density are increased, for example, to intervals of 20p to control parameters for control. Accordingly, the halftone density is controlled and thus the change in 70% density can be suppressed, with the result that the density difference (ID_M–ID_S) between images formed by the upstream apparatus and the downstream apparatus is suppressed so as to be less than 0.15. The image stabilizing control in step S32 is correction control simpler than the density correction control performed though a sequence different from that for print job.

TABLE 4

| | | | Transition of reflection density | | | | | | | |
|---|---|---|---|---|---|---|---|---|---|---|
| | | | 0–500p | 501–1000p | 1001–1500p | 1501–2000p | 2001–2500p | 2501–3000p | 3001–3500p | 3501–4000p |
| Document | | Upstream apparatus | 3% | 3% | 3% | 3% | 3% | 3% | 3% | 3% |
| | | Downstream apparatus | 20% | 20% | 20% | 20% | 20% | 20% | 20% | 20% |
| Density | Maximum density | Upstream apparatus | 1.50 | 1.50 | 1.53 | 1.52 | 1.52 | 1.50 | 1.50 | 1.49 |
| | | Downstream apparatus | 1.51 | 1.49 | 1.51 | 1.50 | 1.49 | 1.52 | 1.53 | 1.54 |
| | 70% density | Upstream apparatus | 0.86 | 0.84 | 0.83 | 0.82 | 0.82 | 0.82 | 0.81 | 0.81 |
| | | Downstream apparatus | 0.84 | 0.90 | 0.94 | 0.94 | 0.93 | 0.95 | 0.94 | 0.93 |
| Density difference | | Maximum density | 0.01 | 0.01 | 0.02 | 0.02 | 0.03 | 0.02 | 0.03 | 0.05 |
| | | 70% density | 0.02 | 0.06 | 0.11 | 0.12 | 0.11 | 0.13 | 0.13 | 0.12 |

Table 4 shows a relationship between the number of prints, and the density and the density difference in the reflection density when performing the image stabilizing control in step S32, i.e, when performing simplified correction control. As is clear from Table 4 in comparison with Table 1, the simplified correction control enables the density difference in the case of 70% density to be reduced to be less than 0.15 in 1501p or larger.

After the control section 250 performs the simplified correction control (image stabilizing control in step S32), the control section 250 determines whether or not the density difference (ID_M–ID_S) between images formed by the upstream apparatus and the downstream apparatus falls within, for example, an allowable range in which the upper limit of the density difference is 0.15, and the lower limit of the density difference is −0.15 (step S33). Furthermore, in the case where the control section 250 determines that the density difference between images formed by the upstream apparatus and the downstream apparatus falls within the allowable range, in other words, the density difference is less than 0.15 (YES in S33), the procedure returns to step S21, and the control section 250 repeats processes from step S21 to step S33. Moreover, in the case where the control section 250 determines that the density difference between images formed by the upstream apparatus and the downstream apparatus falls outside of the allowable range, in other words, the density difference is more than or equal to 0.15 (NO in S33), the procedure moves to step S25, and the control section 250 stops the job, and performs the density correction control.

As described above, Example 3 employs the two-staged density correction control in which the simplified correction control (image stabilizing control in step S32) is performed in the first step, and in the second step, the density correction control is performed through a sequence different from that for print job. The two-staged density correction control makes it possible to suppress to be small the frequency of the density correction control being performed through a sequence different from that for print job, and thus the density difference (ID_M−ID_S) between images formed by the upstream apparatus and the downstream apparatus can be suppressed to be less than 0.15 without deterioration of productivity.

[Modification]

Hereinbefore, the embodiments of the present invention have been described, but the present invention is not limited to the scope described in the embodiments. Namely, various modifications or improvements can be applied to the embodiments described above without departing from the gist of the present invention, and modes subjected to these modifications or improvements are also included in the technical scope of the present invention.

For example, there will be described an image forming system having a configuration in which the first image forming apparatus 20 and the second image forming apparatus 40 can each preferentially select density control of either one of the maximum density and the halftone density. As an example, in the case where the first image forming apparatus 20 and the second image forming apparatus 40 are monochrome apparatuses, the density control of the maximum density tends to be prioritized, whereas, in the case where the apparatuses 20 and 40 are color apparatuses, the density control of the halftone density tends to be prioritized, although the tendencies depend on configurations of the first image forming apparatus 20 and the second image forming apparatus 40.

Figure 9A:
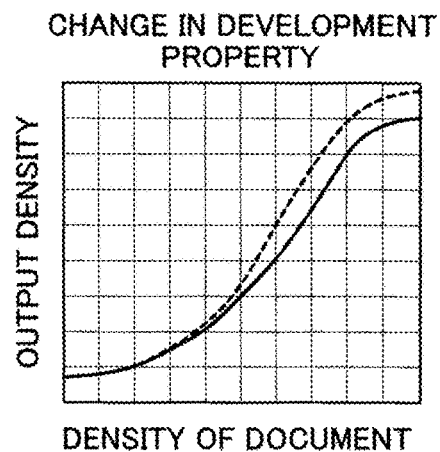
FIGS. 9A to 9C are diagrams each illustrating a change in gradation property in relation to a developer.
Figure 9B:
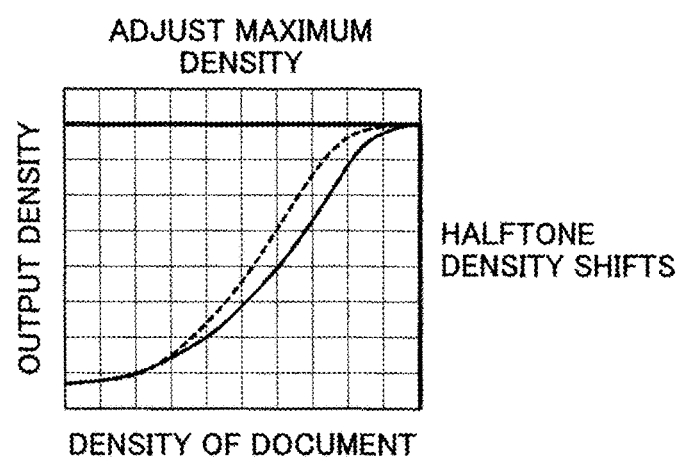
Figure 9C:
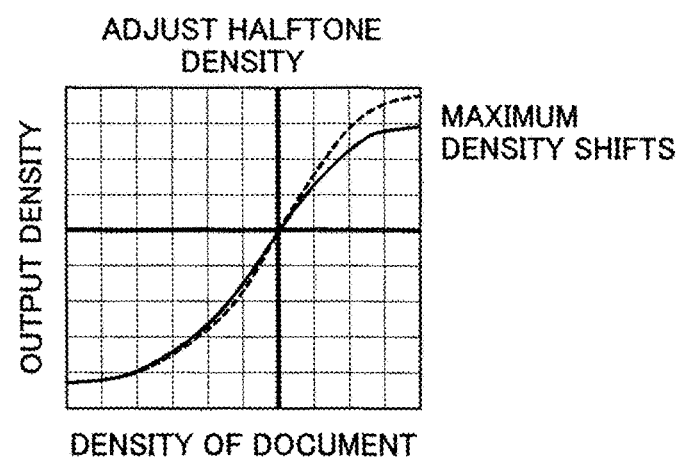

The density control of the maximum density interferes with the density control of the halftone density, and thus, in some cases, it is difficult to maintain both the maximum densities and the halftone densities so as to be the target densities. This will be described with reference to FIGS. 9A to 9C, each of which shows changes in a gradation property in relation to a developer. FIG. 9A uses two lines: the solid line and the broken line to show how the outputted density changes with change in states of a developer when printing is performed under the same development conditions. A halftone density shifts as shown in FIG. 9B in the case where the density control of the maximum density is prioritized and the maximum densities are adjusted in a state where a development property changes as shown in FIG. 9A. A maximum density shifts as shown in FIG. 9C in the case where the density control of the halftone density is prioritized and the halftone densities are adjusted.

Accordingly, the following configuration can be adopted in an image forming system having the configuration in which the first image forming apparatus 20 and the second image forming apparatus 40 can each preferentially select density control of either one of the maximum density and the halftone density. Specifically, in the case where the first image forming apparatus 20 and the second image forming apparatus 40 prioritize the same density control, it is possible to perform the density correction control when the density difference that is not prioritized is more than or equal to a predetermined threshold value.

Furthermore, in the embodiments described above, information detected by the density sensor 27 of the first image forming apparatus 20 and the density sensor 47 of the second image forming apparatus 40 is assumed to be used in order to obtain information on the density difference between images formed by the first image forming apparatus 20 and the second image forming apparatus 40, but the present invention is not limited to the configuration. Specifically, a density sensor 51 is provided on the downstream side of the second image forming apparatus 40, for example, in the vicinity of the sheet conveyance path of the post-processing device 50 as illustrated in FIG. 1. In addition, it is also possible to detect, by the density sensor 51, densities of pixels formed on a sheet conveyed on the sheet conveyance path, and to use information on these densities detected by the density sensor 51, as information on the density difference between images formed by the first image forming apparatus 20 and the second image forming apparatus 40.

The density sensor 51 is one example of the density detecting section that detects densities of tone patch images formed on a sheet, and includes a light emitting section that emits light toward the sheet, and a light receiving section that receives reflected light from the sheet, based on the emitted light. Here, the density sensor 51 is provided in the vicinity of the sheet conveyance path in the post-processing device 50, but the present invention is not limited to the arrangement. It is only necessary to provide the density sensor 51 in the vicinity of the sheet conveyance path and on the downstream side of the second image forming apparatus 40. For example, it may be possible to provide a density correcting unit between the second image forming apparatus 40 and the post-processing device 50, and to provide the density sensor 51 in the vicinity of the sheet conveyance path within the density correcting unit.

An example of detection processing of image densities by the density sensor 51 will be described below. First, in the first image forming apparatus 20, a plurality of toner patch images is formed on one side (for example, on the front side) of a sheet supplied from the sheet feeding apparatus 10 to the first image forming apparatus 20. The sheet having the plurality of toner patch images formed on one side thereof is conveyed through the intermediate apparatus 30 and the second image forming apparatus 40 to the post-processing device 50 without the sheet being reversed upside down in the first image forming apparatus 20. Then, in the post-processing device 50, the density sensor 51 detects (measures) densities of the plurality of toner patch images formed by the first image forming apparatus 20 on the front side of the sheet. The sheet, for which image densities on the front side thereof are detected by the density sensor 51, is directly discharged.

Subsequently, another sheet is supplied from the sheet feeding apparatus 10 to the first image forming apparatus 20. No toner patch image is formed to the sheet in the first image forming apparatus 20. The sheet is reversed upside down, and then is conveyed through the intermediate apparatus 30 to the second image forming apparatus 40. In the second image forming apparatus 40, a plurality of toner patch images is formed on the other side (for example, on the back side) of the sheet. After that, the sheet is conveyed to the post-processing device 50, and in the post-processing device 50, the density sensor 51 detects (measures) densities of the plurality of toner patch images formed by the second image forming apparatus 40 on the back side of the sheet. The sheet, for which image densities on the back side thereof are detected by the density sensor 51, is directly discharged.

Note that, in the example, the sheet is reversed upside down in the first image forming apparatus 20, and then, toner patch images are formed on the other side (for example, on the back side) in the second image forming apparatus 40, but the present invention is not limited to this. It is only necessary that the density sensor 51 can detect densities of toner patch images formed by the first image forming apparatus 20 and densities of toner patch images formed by the second image forming apparatus 40. Therefore, it may be possible to employ a configuration in which the sheet is conveyed to the second image forming apparatus 40 without the sheet being reversed upside down in the first image forming apparatus 20, and toner patch images are formed on one side (for example, on the front side) of the sheet in the second image forming apparatus 40.

The information on density detected by the density sensor 51 is supplied to, for example, the control section 250 of the first image forming apparatus 20 (refer to FIG. 2). The control section 250 acquires information corresponding to the density difference between the density of the toner patch image formed by the first image forming apparatus 20 and the density of the toner patch image formed by the second image forming apparatus 40 on the basis of the information on the density detected by the density sensor 51, and performs control that determines the timing for performing the density correction control.

What is claimed is:

1. An image forming system comprising a plurality of image forming apparatuses which are connected in series, the image forming system includes:
   a respective density sensor for each of the plurality of image forming apparatuses,
   a control section that causes:
      a pattern image for image density control to be formed on an image carrier by each of the plurality of image forming apparatuses,
      the respective density sensors to determine a density of the pattern image for each respective image forming apparatus, and
      density correction control for correcting the density of a formed image on the basis of density information on the formed pattern image for image density control,
   wherein the control section:
   (1) obtains, based on the density of the pattern image for each respective image forming apparatus, determined by the respective density sensors, a density difference between the pattern images formed by the respective image forming apparatuses, and
   (2) determines a timing for performing the density correction control, on the basis of the obtained density difference.

2. The image forming system according to claim 1, wherein
   the control section performs the density correction control through a sequence different from that for print job performed by the plurality of image forming apparatuses.

3. The image forming system according to claim 1, wherein
   the control section performs the density correction control by correcting a gamma curve through image processing.

4. The image forming system according to claim 1, wherein
   the information corresponding to the density difference is coverage information on developers of the plurality of image forming apparatuses.

5. The image forming system according to claim 1, wherein
   the information corresponding to the density difference is density information on the pattern image for image density control formed on the image carrier in each of the plurality of image forming apparatuses.

6. The image forming system according to claim 5, wherein
   the control section performs the density correction control when the density difference generated between the images formed by the plurality of image forming apparatuses is not less than a predetermined first threshold value.

7. The image forming system according to claim 6, wherein
   the control section performs image stabilizing control on the basis of the density information on the pattern image for image density control formed on the image carrier between images when the density difference generated between the plurality of image forming apparatuses is not less than a second threshold value that is smaller than the first threshold value.

8. The image forming system according to claim 1, wherein
   the plurality of image forming apparatuses can each preferentially select density control of either one of a maximum density and a halftone density, and
   in a case where the plurality of image forming apparatuses prioritizes the same density control, the control section executes the density correction control when the difference in a density that is not prioritized is not less than a predetermined threshold value.

9. The image forming system according to claim 1, further comprising:
   a density detecting section provided near a sheet conveyance path on a downstream side of an image forming apparatus on the most downstream of the plurality of the image forming apparatuses, and configured to detect a density of a pixel formed on a sheet conveyed on the sheet conveyance path, wherein
   the control section acquires information corresponding to the density difference, on the basis of information on a density detected by the density detecting section.

10. The image forming system according to claim 1, wherein
    the control section is provided in a most upstream of the plurality of image forming apparatuses.

11. The image forming system according to claim 7, wherein the density correction control is executed at start-up of the image forming system, or when the image forming system is paused, and the control section performs the image stabilizing control during printing operations.

12. The image forming system according to claim 1, wherein the control section performs a stabilizing control during printing operations when an absolute value of the density difference is greater than a first value, and performs density control correction between printing operations when the absolute value of the density difference is greater than a second value that is greater that the first value.

13. The image forming system according to claim 1, wherein the control section performs a stabilizing control during printing operations when an absolute value of the density difference is greater than a first value, and
    the control section determines a second density difference of the pattern images after performing the stabilizing control and performs density control correction between printing operations when the absolute value of the second density difference is greater than a second value.

14. An image forming method for an image forming system including a plurality of image forming apparatuses which are connected in series, the image forming system includes: a respective density sensor for each of the plurality of image forming apparatuses, a control section that causes a pattern image for image density control to be formed on an image carrier by each of the plurality of image forming apparatuses, the respective density sensors to determine a density of the pattern image for each respective image forming apparatus, and density correction control for correcting the density of a formed image on the basis of density information on the formed pattern image for image density control, the method comprising:
obtaining, based on the density of the pattern image for each respective image forming apparatus, determined by the respective density sensors, a density difference between the pattern images formed by the respective image forming apparatuses, and
determining, by the control section, a timing for performing the density correction control, on the basis of the obtained density difference.

15. The image forming method according to claim 14, wherein
the control section performs the density correction control through a sequence different from that for print job performed by the plurality of image forming apparatuses.

16. The image forming method according to claim 14, wherein
the control section performs the density correction control by correcting a gamma curve through image processing.

17. The image forming method according to claim 14, wherein
the information corresponding to the density difference is coverage information on developers of the plurality of image forming apparatuses.

18. The image forming method according to claim 14, wherein
the information corresponding to the density difference is density information on the pattern image for image density control formed on the image carrier in each of the plurality of image forming apparatuses.

19. The image forming method according to claim 18, wherein
the control section performs the density correction control when the density difference generated between the images formed by the plurality of image forming apparatuses is not less than a predetermined first threshold value.

20. The image forming method according to claim 19, wherein
the control section performs image stabilizing control on the basis of the density information on the pattern image for image density control formed on the image carrier between images when the density difference generated between the plurality of image forming apparatuses is not less than a second threshold value, which is smaller than the first threshold value.

21. The image forming method according to claim 14, wherein
the plurality of image forming apparatuses can each preferentially select density control of either one of a maximum density and a halftone density, and
in a case where the plurality of image forming apparatuses prioritizes the same density control, the control section executes the density correction control when the difference in a density that is not prioritized is not less than a predetermined threshold value.

22. The image forming method according to claim 14, wherein
a density detecting section which is provided in the vicinity of a sheet conveyance path on a downstream side of an image forming apparatus located on the most downstream side of the plurality of image forming apparatuses detects a density of a pixel formed on a sheet conveyed on the sheet conveyance path, and
the control section acquires information corresponding to the density difference, on the basis of information on a density detected by the density detecting section.

23. The image forming method according to claim 14, wherein
the control section is provided in a most upstream of the plurality of image forming apparatuses.

* * * * *